United States Patent
Ikeda et al.

(10) Patent No.: US 7,933,795 B2
(45) Date of Patent: Apr. 26, 2011

(54) COLLABORATIVE ORGANIZATION ANALYSIS

(75) Inventors: Kazuaki Ikeda, Tokyo-to (JP); Fusashi Nakamura, Tokyo-to (JP); Hideyuki Mizuta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1562 days.

(21) Appl. No.: 11/184,569

(22) Filed: Jul. 19, 2005

(65) Prior Publication Data

US 2006/0026057 A1 Feb. 2, 2006

(30) Foreign Application Priority Data

Jul. 30, 2004 (JP) ................................ 2004-224269

(51) Int. Cl.
G06F 17/60 (2006.01)
(52) U.S. Cl. .......................................................... 705/10
(58) Field of Classification Search ...................... 705/10
See application file for complete search history.

(56) References Cited

U.S. PATENT DOCUMENTS

| | | | | |
|---|---|---|---|---|
| 5,999,908 | A * | 12/1999 | Abelow ............................ | 705/1 |
| 2002/0133392 | A1 * | 9/2002 | Angel et al. ..................... | 705/10 |
| 2002/0194053 | A1 * | 12/2002 | Barrett et al. ................... | 705/10 |
| 2003/0028412 | A1 * | 2/2003 | Hoffman et al. ................ | 705/10 |
| 2003/0149610 | A1 * | 8/2003 | Rowan et al. ................... | 705/10 |
| 2006/0026057 | A1 * | 2/2006 | Ikeda et al. ..................... | 705/10 |

FOREIGN PATENT DOCUMENTS

| | | |
|---|---|---|
| JP | 2000-353192 | 12/2000 |
| JP | 2002-015095 | 1/2002 |
| JP | 2002024283 | 1/2002 |

OTHER PUBLICATIONS

Mapping communication and collaboration in heterogeneous research networks Jul. 14, 2003 Gaston Heimeriks Social Sciences Department, Royal Netherlands Academy of Arts and Sciences.*
Takashi Koiso et al.; Construction of A System for Evaluating Organizational Structure in Emergency from the Viewpoint of Communication (with English Abstract); Human Interface Society, vol. 1, No. 4, Nov. 25, 1999; 15 pages.

(Continued)

*Primary Examiner* — Beth V Boswell
*Assistant Examiner* — Ernest A Jackson
(74) *Attorney, Agent, or Firm* — Schmeiser, Olsen & Watts; John Pivnichny

(57) ABSTRACT

An apparatus for evaluating organization efficiency, a method for evaluation service of organization efficiency, an apparatus for generating communication frequencies, a method for generating communication frequencies, and programs and recording media of the same, quantitatively evaluate efficiency of an organization structure. The present invention provides an apparatus for evaluating organization efficiency having communication frequencies among departments obtaining unit for obtaining communication frequencies among departments, the frequency being frequencies of information interchanges among departments within an organization; a group definition data obtaining unit for obtaining group definition data, the data defining a group including more than one department within an organization; communication frequencies among groups calculation unit for calculating communication frequencies among groups for groups interchanging information, on the basis of communication frequencies among departments; and an organization efficiency calculation unit for calculating efficiency of an organization structure defined by group definition data, on the basis of the communication frequencies among groups.

18 Claims, 12 Drawing Sheets

OTHER PUBLICATIONS

Hiroyuki Suzuki; System Strategy for BPR; former IBM consultant talks—Reengineering, Kabushikigaisha Soft Research Center, May 25, 1994, first edition, pp. 154-227.

Seung-Hwan Ku; A Study on the trend of Modularization and Cooperative Product Development Process in Japanese Automobile Industry: An Empirical Study in view of the Hierarchy of Product Architecture and Knowledge Integration; Japan Logistics Systems Journal, Japan, The Japan Society of Logistics Systems, Oct. 31, 2002, vol. 3, No. 1, pp. 43-58.

"Introduction to Social Network Methods", Robert A. Hanneman, Department of Sociology, University of California, Riverside, CA 2001.

* cited by examiner

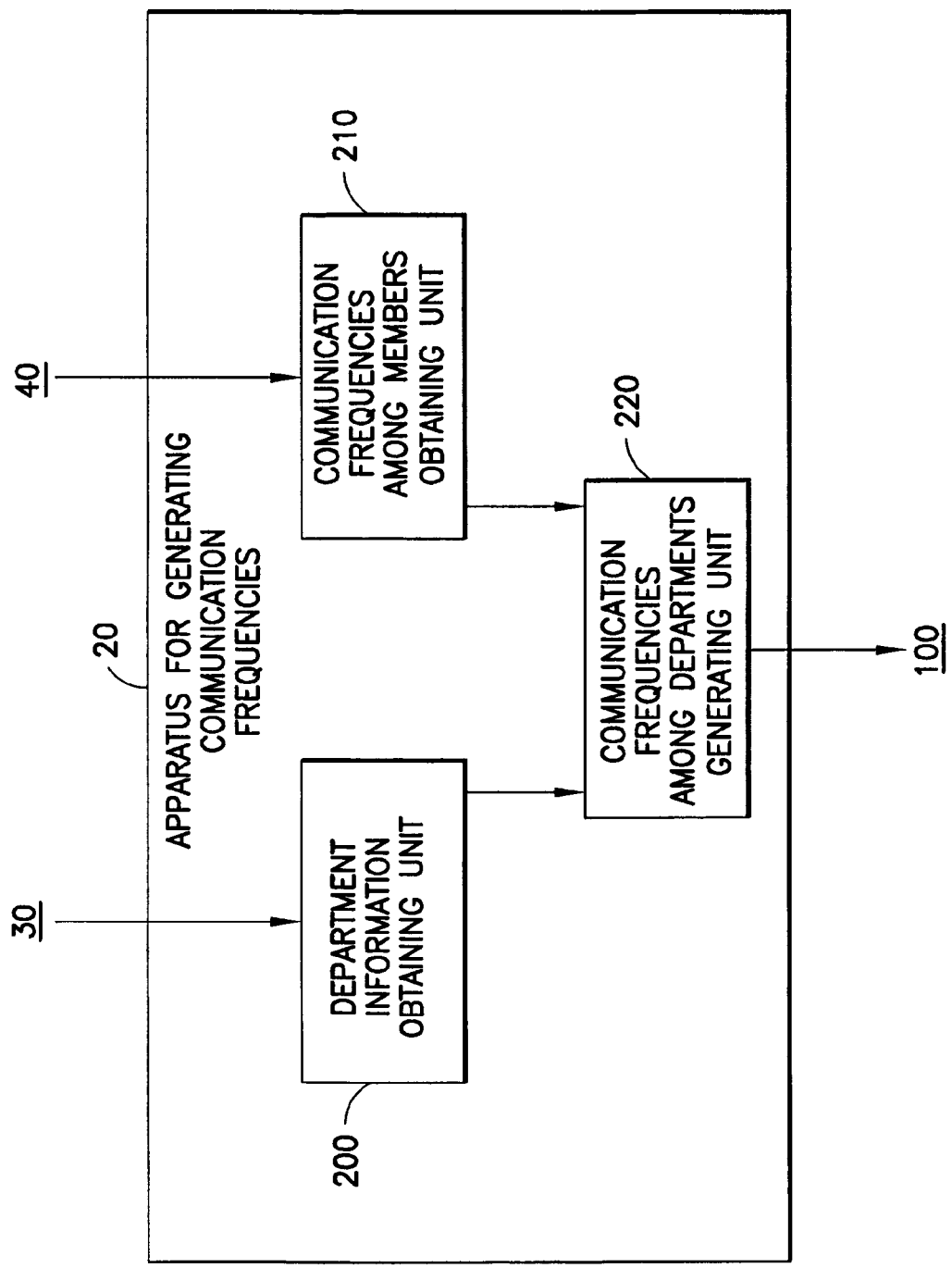

| STAFF MEMBER | LOWER RANKING DEPARTMENT | CHIEF 1 | UPPER RANKING DEPARTMENT | CHIEF 2 | UPPER RANKING DEPARTMENT |
|---|---|---|---|---|---|
| aaa1 | $A_1$ | aaa1 | $A_1$ | — | — |
| ccc12 | $C_{21}$ | aaa1 | $A_1$ | bbb2 | $B_2$ |
| ccc22 | $C_{22}$ | aaa2 | $A_2$ | bbb2 | $B_2$ |
| ⋮ | ⋮ | ⋮ | ⋮ | ⋮ | ⋮ |

| SOURCE | DESTINATION | COMMUNICATION FREQUENCIES |
|--------|-------------|---------------------------|
| A1a1 | A1a2 | $f_{A1a1-A1a2}$ |
| A1a1 | A2a3 | $f_{A1a1-A2a3}$ |
| A1a1 | C11c4 | $f_{A1a1-C11c4}$ |
| ... | ... | ... |
| B1b2 | C22c1 | $f_{B1b2-C22c1}$ |
| ... | ... | ... |

FIG.4

| SOURCE | DESTINATION | COMMUNICATION FREQUENCIES |
|--------|-------------|---------------------------|
| $A_1$ | $A_1$ | $f_{A1-A1}$ |
| $A_1$ | $A_2$ | $f_{A1-A2}$ |
| $A_1$ | $C_{11}$ | $f_{A1-C11}$ |
| $A_1$ | $D_{11}$ | $f_{A1-D12}$ |
| ... | ... | ... |
| $B_1$ | $C_{22}$ | $f_{B1-C22}$ |
| ... | ... | ... |

70

COLLABORATIVE ORGANIZATION ANALYSIS

TECHNICAL FIELD

The present invention relates to an apparatus for evaluating organization efficiency, a method for evaluation service of organization efficiency, an apparatus for generating communication frequencies, a method for generating communication frequencies, programs and recording media of the same. Specifically, the present invention relates to an apparatus for evaluating organization efficiency for evaluating efficiency of organization on the basis of a structure of the organization, a method for evaluation service of organization efficiency, an apparatus for generating communication frequencies, a method for generating communication frequencies, programs and recording media of the same.

BACKGROUND OF THE INVENTION

An organization such as a company has a particular structure for persons to cooperate to get a big achievement. A network in terms of sociology, for example a network for exchanging information via means including a conversation, a telephone call, or an email message develops in a group of people. An organization such as a company establishes its organization structure for efficiently operating its management resources in order to efficiently perform its management strategy and achieve its business objective.

An organization implements its management strategy by breaking the strategy down into routine works. The routine works involve communication. Thus, a manager of an organization can check whether or not the organization has an efficient structure by checking whether or not the organization has a communication network as the manager intended. Information is exchanged in a company that operates somewhat standardized work such as a manufacturer according to its workflow. Conventionally, a manager of an organization can easily check whether communication within the organization matches its management strategy.

For example, a technique for identifying a leading role in a communication network based on Social Network Theory (SNA) is described in the document "Introduction to Social Network Methods", by Robert A. Hanneman, published in 2001 by the Department of Sociology at the University of California at Riverside. With this technique, anybody can check whether a person in an important position for an actual management strategy plays a leading role in a communication network or not.

DISCLOSURE OF THE INVENTION

As works operated in a company has speeded up and diversified, roles played by a research and development department, which performs a mid and long term management strategy, and a service department, which requires a quick response to a various needs from customers have become more important. In spite of their standardized operation, these departments exchange information in various ways according to circumstances inside or outside the company. Unlike in a department that operates a standardized work, it is not easy to check whether or not communication within the organization matches their management strategy in a quantitative way in these departments.

The technique described in the Hanneman Document does not take account of an organization structure. Thus, the technique cannot determine whether the organization structure is efficient or not. An alteration to an organization structure based on the management strategy planned by a company influences the whole of the organization from the top of the hierarchy such as the top management to the bottom of the hierarchy such as rank-and-file workers. In order to check how the management strategy is practiced, a company often has to check its communication network by taking up and checking only a part of the organization. However, the technique described in the Hanneman Document cannot determine only about a part of the organization.

The present invention intends to provide an apparatus for evaluating organization efficiency, a method for evaluation service of organization efficiency, an apparatus for generating communication frequencies, a method for generating communication frequencies, programs and recording media of the same to solve the problems. The object is achieved by a combination of characteristics described in independent Claims in the appended Claim. Dependent Claims define further advantageous specific examples of the present invention.

OBJECTS AND SUMMARY OF THE INVENTION

In order to solve the abovementioned problems, a first embodiment of the present invention provides an apparatus for evaluating organization efficiency comprising:

a communication frequency among departments obtaining unit for obtaining communication frequencies among departments, said frequency being frequencies of information interchanges among a plurality of departments within an organization;

a group definition data obtaining unit for obtaining group definition data, said data defining a group including more than one of said departments within said organization;

a communication frequency among groups calculation unit for calculating communication frequencies among groups for said plurality of groups interchanging information, on the basis of said communication frequencies among departments; and an organization efficiency calculation unit for calculating efficiency of an organization structure defined by said group definition data, on the basis of said communication frequencies among groups, a method for evaluation service of organization efficiency using the apparatus for evaluating organization efficiency, a program for controlling the apparatus for evaluating organization efficiency, and a medium storing the program.

A second embodiment of the present invention provides an apparatus for generating communication frequencies comprising:

a department information obtaining unit for obtaining member's belonging department information indicative of a department to which each member of an organization belongs;

a communication frequency among members obtaining unit for obtaining communication frequencies among members, said frequency being frequencies of information interchanges among a plurality of members belonging to an organization; and a communication frequency among departments generating unit for generating communication frequencies among departments, said frequency being frequencies of information interchanges among said plurality of departments, on the basis of said communication frequencies among members and said department information, a method for generating communication frequencies using the apparatus for generating communication frequencies, a program for controlling the apparatus for generating communication frequencies, and a medium storing the program.

A third embodiment of the present invention provides an apparatus for evaluating organization efficiency comprising:

an organization structure data obtaining unit for obtaining organization structure data indicative of a higher ranking department to which each of lower ranking departments being subordinate for a plurality of departments within an organization;

a group definition data obtaining unit for obtaining group definition data that defines a group including more than one department and new cooperative relationship to be created among groups;

a target organization structure data generating unit for generating a structure, in which each department belonging to a group defined by said group definition data is considered as a higher ranking department and a department subordinate to the higher ranking department in said organization structure data is considered as a lower ranking department, as target organization structure data; and an organization efficiency calculation unit for calculating efficiency of an organization structure indicated by said target structure data, on the basis of said group definition data and said organization structure data, a method for evaluation service of organization efficiency using the apparatus for evaluating organization efficiency, a program for controlling the apparatus for evaluating organization efficiency, and a medium storing the program.

The outline of the present invention does not comprehend all the necessary characteristics of the present invention and sub combinations of a group of the characteristics can also be included in the present invention.

According to the present invention, efficiency of an organization structure can be quantitatively evaluated.

BRIEF DESCRIPTION OF THE DRAWINGS

FIG. 2 is a diagram for illustrating a configuration of an apparatus for generating communication frequencies 20 by classifying it into function blocks;

FIG. 3 (b) shows a structure of an organization defined by personnel information 30;

FIG. 4 shows an example of communication frequencies among members 40;

FIG. 5 (b) shows an exemplary configuration of an organization altered by management strategy data 50;

FIG. 7 (b) shows communication frequencies among departments 70 in a graph;

DETAILED DESCRIPTION OF THE PREFERRED EMBODIMENT

The present invention will be described according to embodiments of the present invention. The embodiments below do not limit the present invention defined by the appended Claims. Neither all the combinations of characteristics described in the embodiments are necessary for the solution of the present invention.

Figure 1:
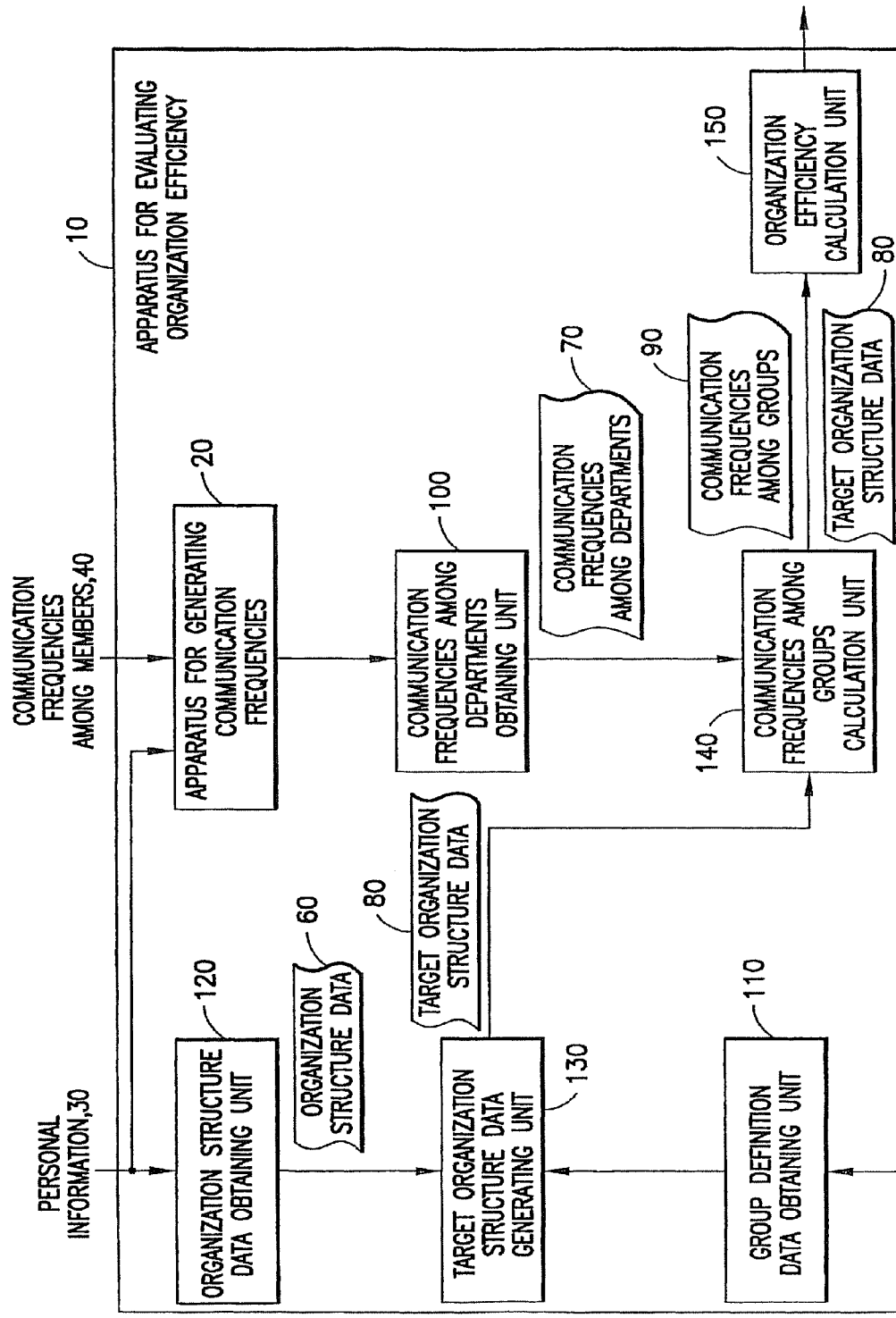
FIG. 1 is a diagram for illustrating a configuration of apparatus for evaluating organization efficiency 10 by classifying it into function blocks.

FIG. 1 is a diagram for illustrating a configuration of apparatus for evaluating organization efficiency 10 by classifying it into function blocks. Apparatus for evaluating organization efficiency 10 includes apparatus for generating communication frequencies 20, communication frequencies among departments obtaining unit 100, group definition data obtaining unit 110, organization structure data obtaining unit 120, target organization structure data generating unit 130, communication frequencies among groups calculation unit 140, and organization efficiency calculation unit 150. Apparatus for evaluating organization efficiency 10 intends to evaluate organization efficiency of a group defined by management strategy on the basis of frequencies of information interchanges among individuals and an organization structure of a company based on personnel information.

Apparatus for generating communication frequencies 20 generates communication frequencies among departments 70, which is frequencies of information interchanges among departments within an organization on the basis of personnel information 30 of an organization and communication frequencies among members 40, which is frequencies of information interchanges among members belonging to an organization. Communication frequencies among departments obtaining unit 100 obtains communication frequencies among departments 70 generated by apparatus for generating communication frequencies 20. Group definition data obtaining unit 110 defines groups, each group containing more than a department within an organization, and obtains group definition data for defining cooperative relationship among the groups from management strategy data 50. Group definition data obtaining unit 110 may further determines a target value of communication frequencies corresponding to the defined cooperative relationship on the basis of management strategy data 50 and obtains the value as group definition data.

Organization structure data obtaining unit 120 receives personnel information 30 of an organization, and generates, based on the personnel information 30, organization structure data 60 indicative of a higher ranking department to which each of lower ranking departments being subordinate for a plurality of departments within an organization. Target organization structure data generating unit 130 generates target organization structure data 80 indicative of an organization structure, which is a strategic target, on the basis of group definition data and organization structure data 60. Specifically, target organization structure data generating unit 130 generates a structure, in which each department belonging to a group defined by group definition data is considered as a higher ranking department and a department subordinate to the higher ranking department in organization structure data 60 is considered as a lower ranking department, as target organization structure data 80. Target organization structure data 80 may further include a target value of communication frequencies corresponding to cooperative relationship defined by group definition data.

Communication frequencies among groups calculation unit 140 calculates communication frequencies among groups 90, which is frequencies of information interchanges among groups on the basis of communication frequencies among departments 70 and target organization structure data 80. Organization efficiency calculation unit 150 calculates efficiency of an organization structure of a group defined by group definition data on the basis of communication frequencies among groups 90 and target organization structure data 80. For example, organization efficiency calculation unit 150 may calculate a target value of communication frequencies among groups 90 on the basis of target organization structure data 80 for a group defined by group definition data and calculate an indicator based on an achievement ratio of communication frequencies among groups 90 to the calculated target value as efficiency of an organization structure.

FIG. 2 is a diagram for illustrating a configuration of apparatus for generating communication frequencies 20 by classifying it into function blocks. Apparatus for generating communication frequencies 20 has department information obtaining unit 200, communication frequencies among members obtaining unit 210, and communication frequencies among departments generating unit 220. Department information obtaining unit 200 obtains department information indicative of a department, to which each member of an organization belongs, from personnel information 30. Communication frequencies among members obtaining unit 210 obtains communication frequencies among members 40, which is frequencies of information interchanges among members belonging to an organization. Communication frequencies among departments generating unit 220 generates communication frequencies among departments 70 on the basis of communication frequencies among members 40 and department information.

Figures 3A, 3B:
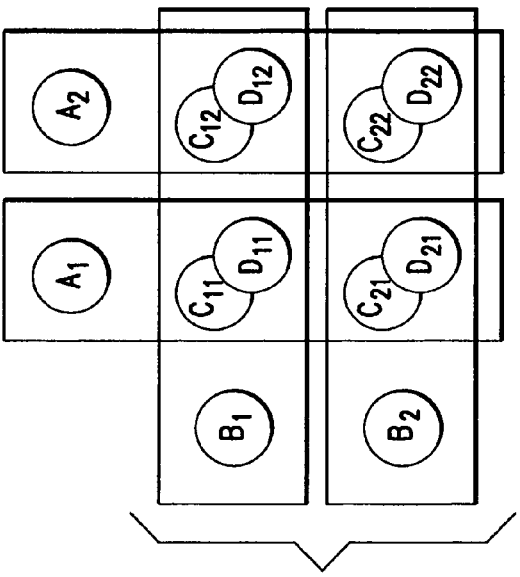
FIG. 3 (a) shows an example of personnel information 30.

FIG. 3 (a) shows an example of personnel information 30. Personnel information 30 shows a lower ranking department, to which a staff member belongs, the name of the chief of the lower ranking department, a higher ranking department, to which the lower ranking department subordinate, and the name of chief of the higher ranking department for each staff member of an organization. For example, staff member aaa1 belongs to department $A_1$. The staff member aaa1 is chief of the department $A_1$. The department $A_1$ is chief of and an immediate superior department to higher ranking departments that manage departments $C_{11}$, $D_{11}$, $C_{21}$, and $C_{22}$. Therefore, a higher ranking department to department $A_1$ is also department $A_1$ for convenience.

Staff member ccc12 belongs to subordinate department $C_{21}$. Department $C_{21}$ subordinates to higher ranking department $A_1$. A chief of higher ranking department $A_1$ is staff member aaa1. Department $C_{21}$ belongs to higher ranking department $B_2$. Chief of higher ranking $B_2$ is staff member bbb2. Similarly, a subordinate department to which staff member ccc22 belongs is $C_{22}$. $C_{22}$ is subordinate to higher ranking departments $A_2$ and $B_2$. Chief of higher ranking $A_2$ is staff member aaa2.

FIG. 3 (b) shows a structure of an organization defined by personnel information 30. A circle indicates a subordinate department. A heavy-line frame indicates a higher ranking department. Each of higher ranking departments $A_1$ and $A_2$ deals with a different product. For example, higher ranking department $A_1$ deals with product 1 and higher ranking department $A_2$ deals with product 2. Chief of the department $A_1$ is aaa1. Each of higher ranking departments $B_1$ and $B_2$ covers a different work. For example, higher ranking department $B_1$ is a division covering sales activity. Higher ranking department $B_2$ is a division covering manufacture. Chief of the division is bbb2. Actually, an organization shown in FIG. 3 is further subordinate to an organization immediately subordinate to the head quarter or president.

Subordinate departments $C_{21}$ and $C_{22}$ are subordinate to each of higher ranking departments according to their dealing products and covering business operations. For example, $C_{22}$ is subordinate to each of higher ranking departments $A_2$ and $B_2$. In this manner, an organization defined by personnel information 30 has a matrix structure where a lower ranking department may belong to higher ranking departments. Each of $D_{11}$, $D_{12}$, $D_{21}$, and $D_{22}$ is subordinate to each of $C_{11}$, $C_{12}$, $C_{21}$, and $C_{22}$.

FIG. 4 shows an example of communication frequencies among members 40. Communication frequencies among members 40 includes communication frequencies among staff members in association with a set of a staff member who gives information and a staff member who takes the information. For example, frequencies of information given from staff member $A1a1$ to $A1a2$ is $fA1a1$-$A1a2$. Communication frequencies among members 40 is a value based at least on frequencies of sending/receiving email messages interchanged among staff members and amount of data sent/received by email messages. Communication frequencies among members 40 indicates frequencies of information interchanges among staff members belonging to an organization.

Figures 5A, 5B:
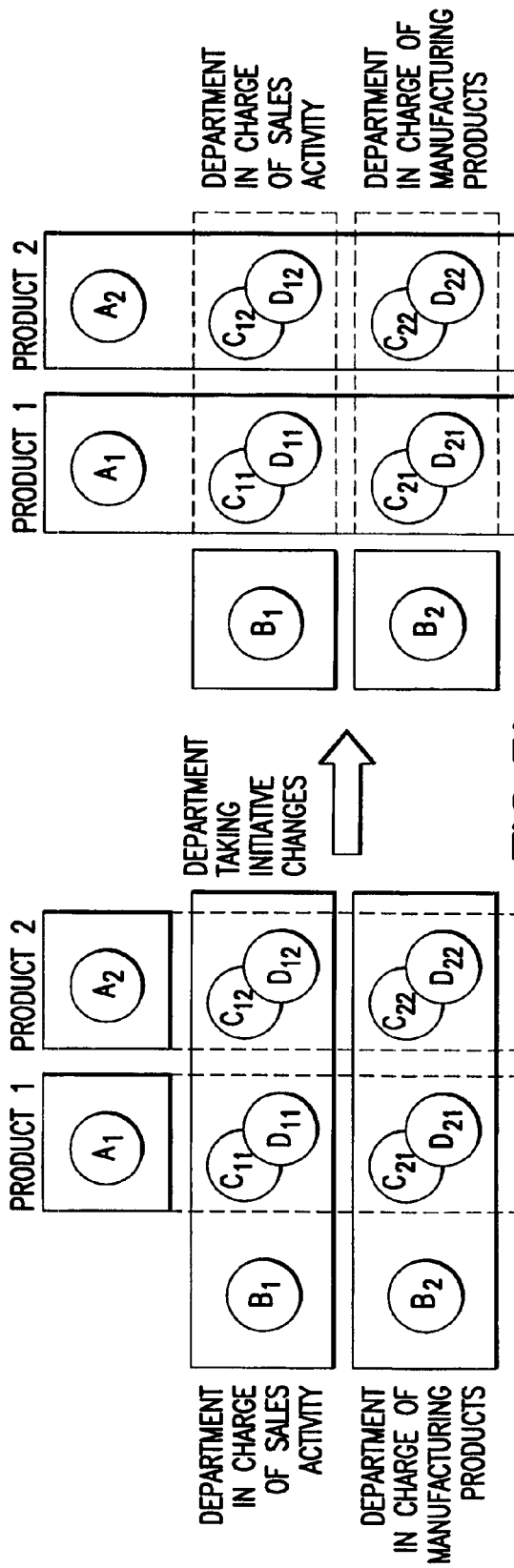
FIG. 5 (a) shows an example of management strategy data 50.

FIG. 5 (a) shows an example of management strategy data 50. Management strategy data 50 defines a department included in a group and cooperative relationship among the group and the other groups for each group. For example, management strategy data 50 defines that group $N_{10}$ includes department $A_1$. Management strategy data 50 further defines cooperative relationship that group $N_{10}$ plans implementation and instructs groups $N_{11}$ and $N_{12}$ to start development and sales activity.

Management strategy data 50 defines that group $N_{11}$ includes department $C_{11}$. Management strategy data 50 also defines cooperative relationship that group $N_{11}$ performs sales activity to market products according to the instruction from group $N_{10}$. Management strategy data 50 defines that group $N_{12}$ includes department $C_{21}$. Management strategy data 50 also defines cooperative relationship that group $N_{12}$ manufactures and provides the products to group $N_{11}$ according to the instruction from group $N_{10}$.

Department $D_{11}$ subordinate to department $C_{11}$ may be included in group $N_{11}$ even if management strategy data 50 does not explicitly indicate that. An implicit rule may be provided such that when a higher ranking department belongs to a certain group, a subordinate department belonging to the higher ranking department also belongs to the same group. This implicit rule can enable management strategy data 50 to be created easily. For example, an implicit rule may be provided such that the third ranked departments from the top ranking department belong to the same group, or another implicit rule may be provided such that subordinate departments, the second ranked department from which is the same, cooperates.

As FIG. 5 shows, management strategy data 50 is text data describing groups and cooperative relationship among the groups in natural language, for example. In this case, group definition data obtaining unit 110 may generate group definition data for defining groups and cooperative relationship among the groups in a data structure such as a graph on the basis of management strategy data 50 described in natural language.

FIG. 5 (b) shows an exemplary configuration of an organization altered by management strategy data 50. Management strategy indicated by management strategy data 50 alters a chain of command in the organization changes from a chain lead by each department in charge to a chain lead by each product. More specifically, a chain of command in the organization is lead by a higher ranking department in charge of sales activity and a higher ranking department in charge of manufacturing products before the management strategy is deteminined. In this case, subordinate departments in a rectangular frame cooperate with each other, for example.

After the company plans its management strategy, the chain of command is lead by a higher ranking department dealing with product 1 and a higher ranking department dealing with product 2. In this case, subordinate departments in a rectangular frame cooperate with each other, for example. Under cooperative relationship indicated by management strategy data 50, the basic structure of an organization remains unchanged but the chain of command is lead by a different department.

Figure 6:
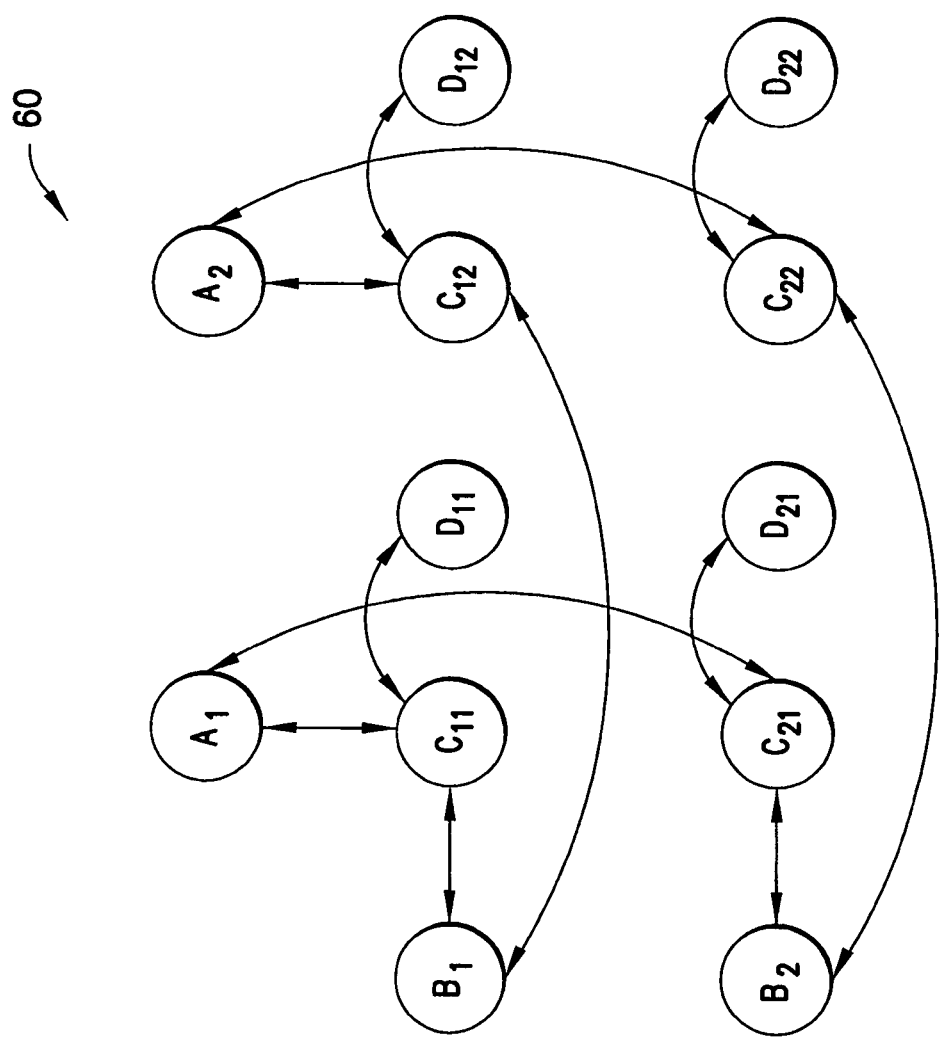
FIG. 6 shows an example of organization structure data 60.

FIG. 6 shows an example of organization structure data 60. Organization structure data 60 is shown by a graph with a node representing each department and a link representing each subordinate relationship among departments. More specifically, a node representing a department is directly connected by link to another node representing another department which is directly subordinate to the first department. For example, department $C_{11}$ is directly subordinate to each of departments $A_1$ and $B_1$. Thus, a node representing department $C_{11}$ is directly connected by link to a node representing each of departments $A_1$ and $B_1$. Department $D_{11}$ is directly subordinate to department $C_{11}$ but not directly subordinate to each of departments $A_1$ and $B_1$. Thus, a node representing department $D_{11}$ is directly subordinate only to a node representing department $C_{11}$.

FIG. 7 (a) shows communication frequencies among departments 70 in a list. Communication frequencies among departments 70 includes communication frequencies of information interchanged among departments in association with a set of a department giving information and a department taking the information. For example, frequencies of information given from department $A_1$ to $A_1$ is fA1-fA1. Organization structure data 60 is a value based at least on frequencies of sending/receiving email messages interchanged among departments and amount of data sent/received by email messages. Communication frequencies among members 40 indicates frequencies of information interchanges among departments within an organization.

FIG. 7 (b) shows communication frequencies among departments 70 in a graph. Each department is represented by a node. When information is interchanged among departments, nodes representing these departments are connected by link. As information is interchanged between departments $C_{11}$ and $C_{21}$, for example, nodes representing departments $C_{11}$ and $C_{21}$ are connected by link. As no information is interchanged between departments $C_{12}$ and $C_{22}$, nodes representing departments $C_{12}$ and $C_{22}$ are not directly connected by link.

Figures 7A, 7B:
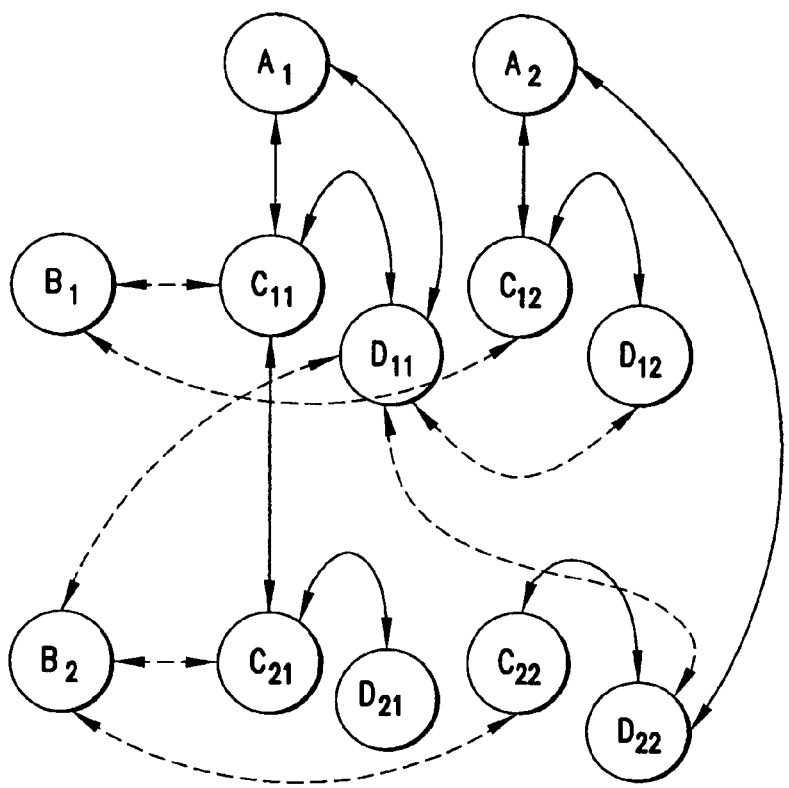
FIG. 7 (a) shows communication frequencies among departments 70 in a list.

A link shown by solid lines in FIG. 7(b) represents information interchanges corresponding to cooperative relationship among groups defined by target organization structure data 80. A link shown by dashed lines represents information interchanges not corresponding to cooperative relationship among groups defined by target organization structure data 80.

Figure 8:
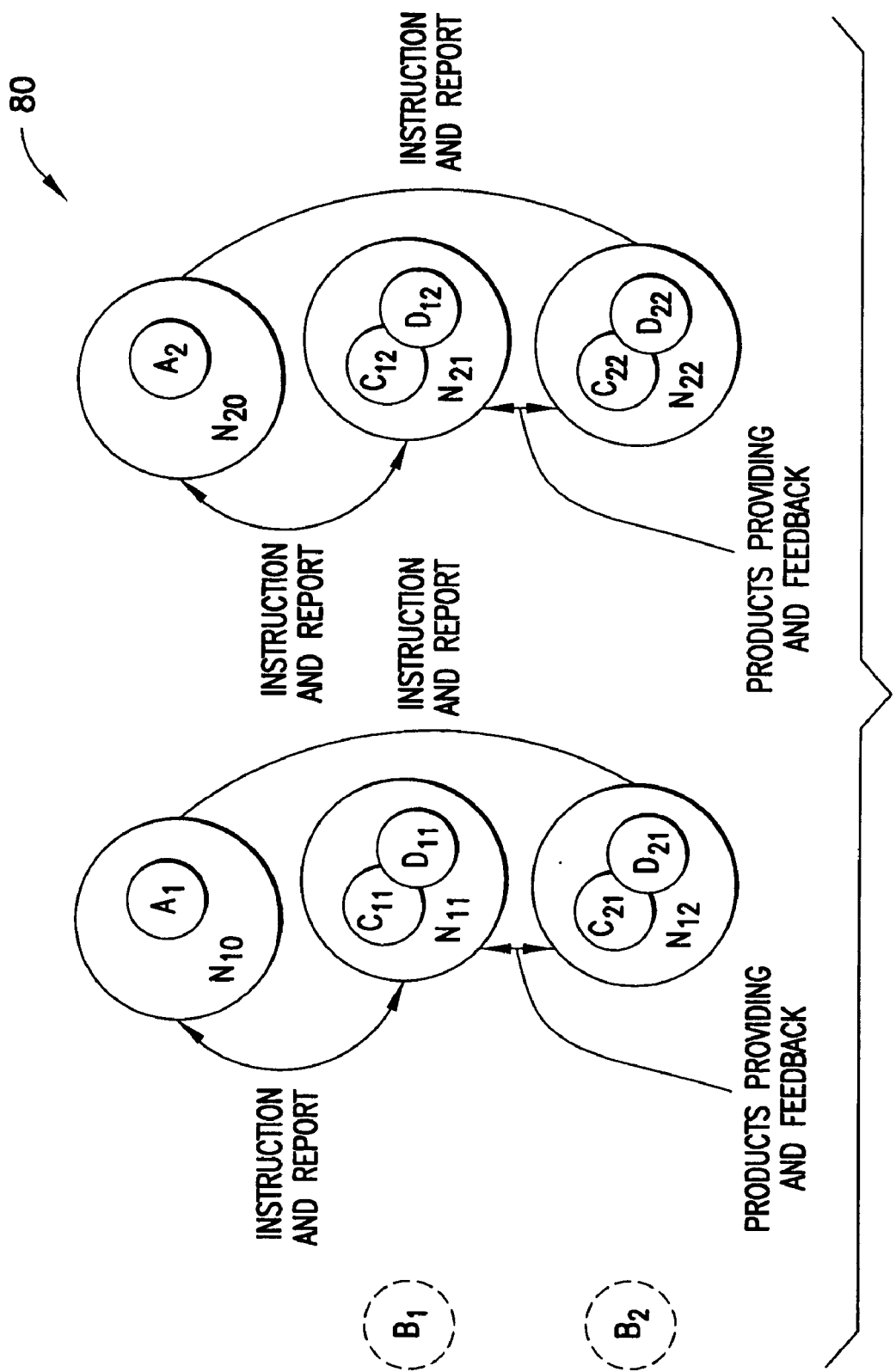
FIG. 8 shows an example of target organization structure data 80.

FIG. 8 shows an example of target organization structure data 80. Each small node in FIG. 8 represents a department. Each bigger node containing the small node represents a group to which the department belongs. Each link connecting bigger nodes represents cooperative relationship among the groups. For example, the link connecting groups $N_{10}$ and $N_{11}$ represents an instruction from group $N_{10}$ to group $N_{11}$ and a report or the like from group $N_{11}$ to group $N_{10}$. Departments that are not defined by group definition data are represented as nodes shown by dashed lines. Although a weight indicative of a targeted communication frequencies is associated with each link, the weight for each link is the same value in the embodiment. Thus, description about a weight will be omitted.

Figure 9:
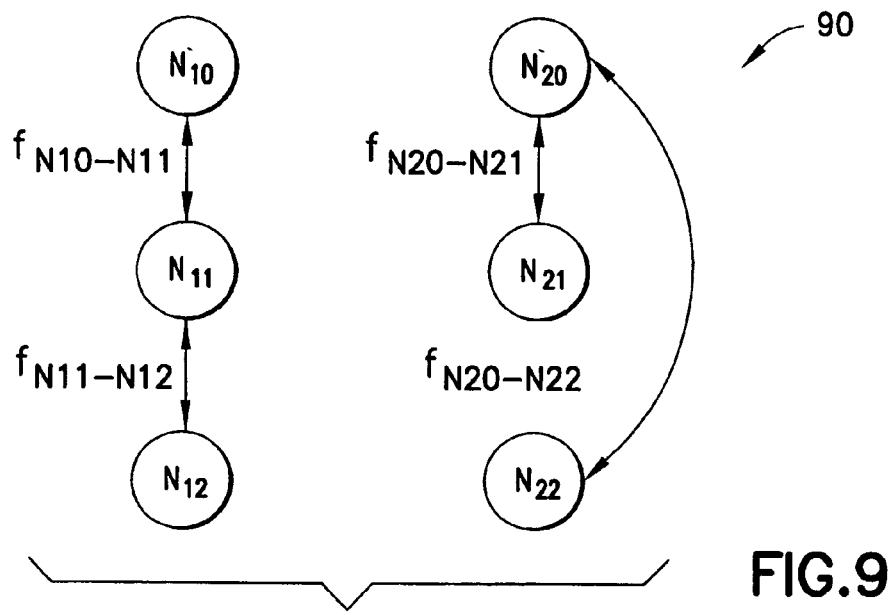
FIG. 9 shows an example of communication frequencies among groups 90.

FIG. 9 shows an example of communication frequencies among groups 90. Each node shown in FIG. 9 represents a group defined by group definition data. A link between nodes represents frequencies of information interchanges corresponding to cooperative relationship among the groups. When no information is interchanged between groups, no link is generated between the nodes representing the groups. For example, frequencies of information interchanges between Group $N_{10}$ and Group $N_{11}$ is fN10-N11. No information is interchanged between group $N_{21}$ and group $N_{22}$.

Figure 10:
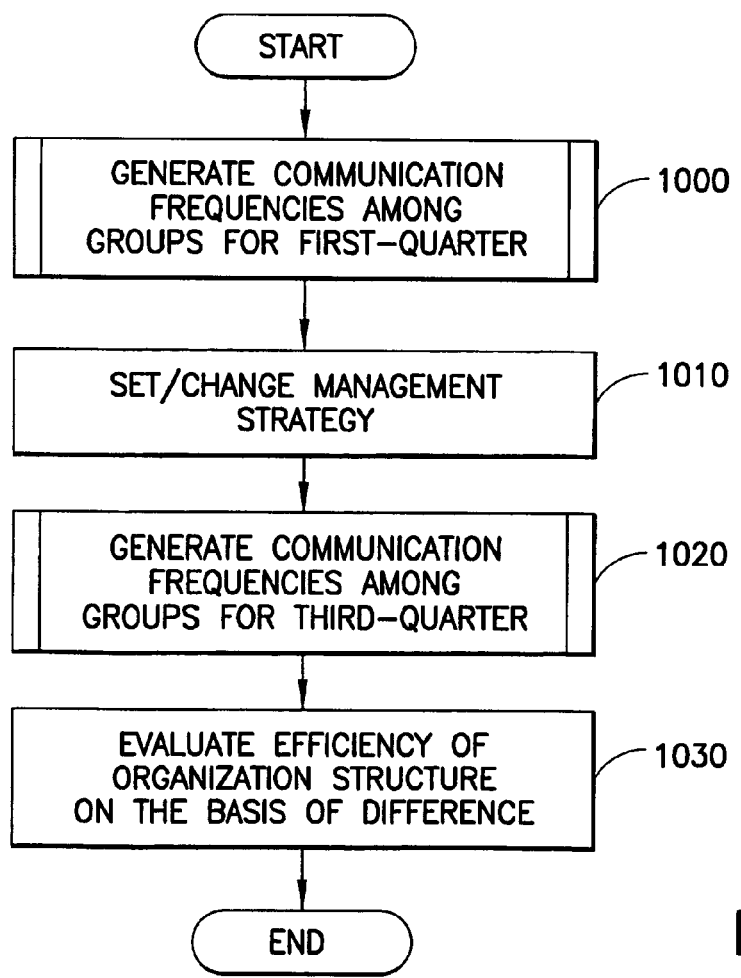
FIG. 10 shows a first example of a process that apparatus for evaluating organization efficiency 10 evaluates efficiency of an organization.

Two examples of evaluating organization efficiency with apparatus for evaluating organization efficiency 10 will be described with reference to FIGS. 10 to 13. FIG. 10 shows a first example of a process that apparatus for evaluating organization efficiency 10 evaluates organization efficiency. Apparatus for evaluating organization efficiency 10 generates first communication frequencies among groups, which are communication frequencies among groups for the first-quarter of a business year (1000). Then, a manager sets new management strategy or changes management strategy in a period between the first-quarter to the third-quarter (1010).

Next, apparatus for evaluating organization efficiency 10 calculates first communication frequencies among groups. After a predetermined period (for example, after two quarters), apparatus for evaluating organization efficiency 10 generates second communication frequencies among groups, which are communication frequencies among groups for the third quarter (1020). Then, organization efficiency calculation unit 150 calculates an indicator on the basis of the first communication frequencies among groups and the second communication frequencies among groups as efficiency of an organization structure (1030).

For example, organization efficiency calculation unit 150 calculates a difference between amounts of communication corresponding to cooperative relationship defined by management strategy for each of the first and the second communication frequencies among groups. Organization efficiency calculation unit 150 determines whether communication frequencies corresponding to predetermined cooperative relationship for second communication frequencies among groups is more than communication frequencies corresponding to predetermined cooperative relationship for first communication frequencies among groups by a predetermined percentage or not. When communication frequencies among groups for a part corresponding to cooperative relationship among groups increases more than 30%, organization efficiency calculation unit 150 may evaluate that the organization structure is effective.

Figure 11:
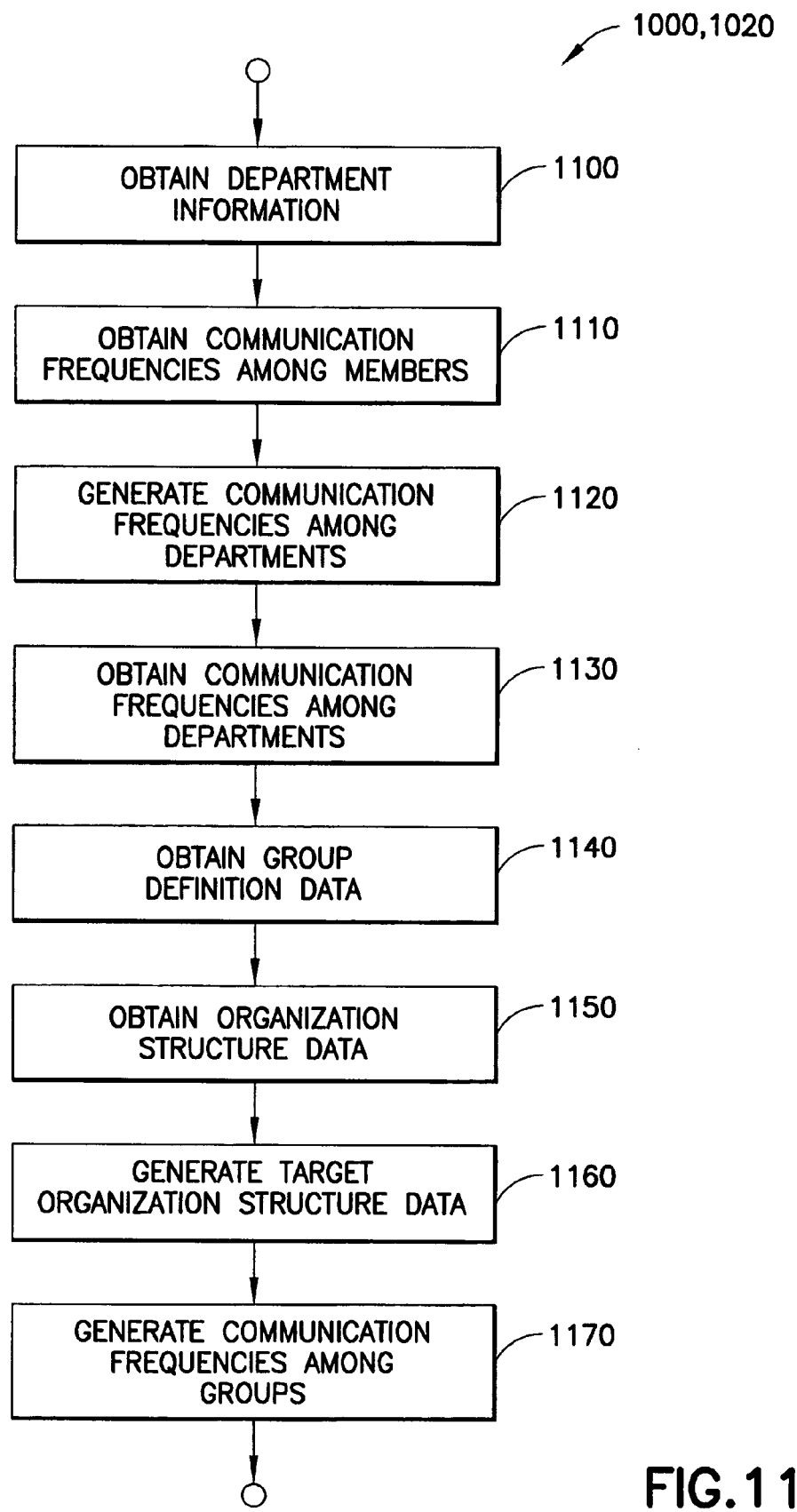
FIG. 11 shows detailed processes in 1000 and 1020.

FIG. 11 shows detailed processes in 1000 and 1020. First, a process in 1000 will be described. Department information obtaining unit 200 obtains department information for the first quarter (1100). Communication frequencies among members obtaining unit 210 obtains communication frequencies among members 40 for the first quarter (1110). For example, communication frequencies among members obtaining unit 210 may obtain communication frequencies among members 40 based on frequencies of meetings that staff members attended or may obtain communication frequencies among members 40 based on frequencies of phone calls or duration of phone calls among staff members. Meeting includes a conference call, a video call and the like. Communication frequencies among members obtaining unit 210 may obtain frequencies of members' reading of the same document as communication frequencies among members 40 for each pair of members or may obtain frequencies of members' interchanges of instant messages and short messages as communication frequencies among members 40 for each pair of members.

Communication frequencies among departments generating unit 220 generates communication frequencies among departments 70 on the basis of department information and communication frequencies among members 40 (1120). Communication frequencies among departments obtaining unit 100 obtains communication frequencies among departments 70 generated by communication frequencies among departments generating unit 220 (1130). Group definition data obtaining unit 110 obtains group definition data on the basis of management strategy data 50 (1140). Organization structure data obtaining unit 120 obtains organization structure data 60 from personnel information 30 (1150).

Target organization structure data generating unit 130 generates target organization structure data 80 indicative of an organization structure, which is a strategic target, on the basis of group definition data and organization structure data 60 (1160). Specifically, target organization structure data generating unit 130 generates a structure, in which each department belonging to a group defined by group definition data is considered as a higher ranking department and a department subordinate to the higher ranking department in organization structure data 60 is considered as a lower ranking department, as target organization structure data 80. Communication frequencies among groups calculation unit 140 generates communication frequencies among groups 90 (1170).

A process in 1020 is almost the same as that in 1000 except that department information and communication frequencies among members 40 are for the third quarter. Thus, description about the process in 1020 will be omitted.

Figure 12:
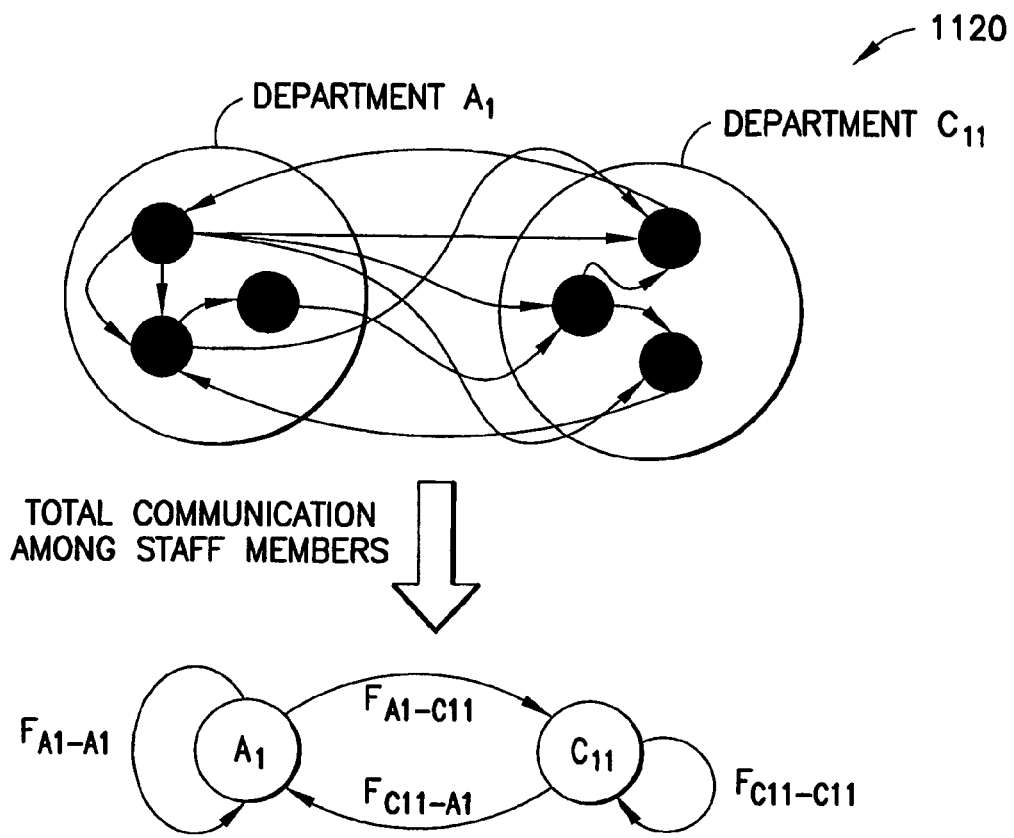
FIG. 12 shows a conceptual diagram of a process for generating communication frequencies among departments 70 in 1120.

FIG. 12 shows a conceptual diagram of a process for generating communication frequencies among departments 70 in 1120. The upper figure shows communication frequencies among members 40. In this figure, each small node represents a staff member and a circle containing the nodes represents a department. A communication among staff members is represented as a link that connects small nodes. In FIG. 12, staff members belonging to department $A_1$ interchange information. Information is interchanged among staff members belonging to department $A_1$ and staff members belonging to department $C_{11}$.

The lower figure shows communication frequencies among departments 70 generated from communication frequencies among members 40. Each node in this figure represents a department and each link in this figure represents information interchanges among departments. For example, an information interchange within department $A_1$ is represented by a link coming out from node $A_1$ and returning to node $A_1$ ($F_{A1\text{-}A1}$). Information interchanges between a staff member belonging to department $A_1$ and a staff member belonging to department $C_{11}$ are represented by links between node $A_1$ and node $C_{11}$ ($F_{A1\text{-}C11}$, $F_{C11\text{-}A1}$). In this manner, communication frequencies among departments generating unit 220 generates communication frequencies among departments 70 indicative of information interchanges among departments by integrating information interchanges among staff members for each department.

According to the first example, apparatus for evaluating organization efficiency 10 can determine whether management strategy is properly practiced or not by comparing communication frequencies among groups before and after the setting or changing of the management strategy.

Figure 13:
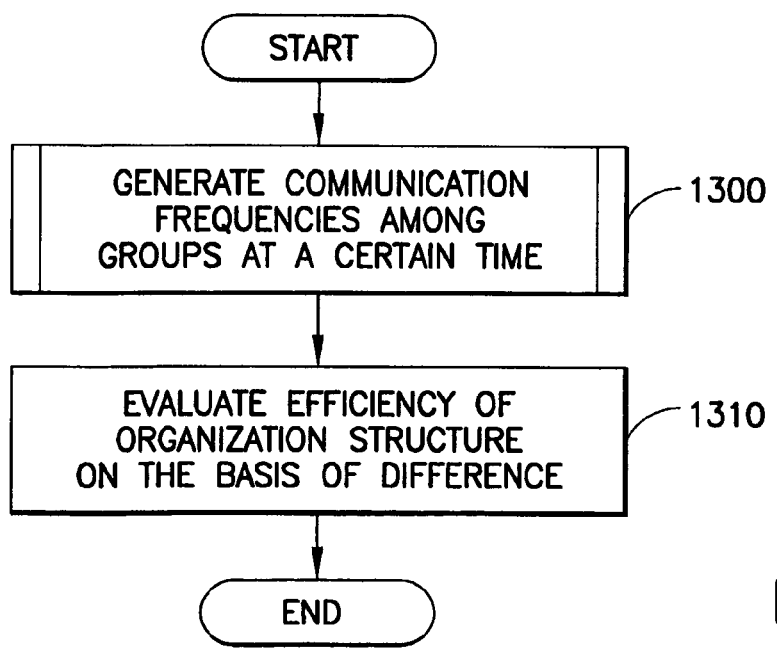
FIG. 13 shows a second example of a process that apparatus for evaluating organization efficiency 10 evaluates organization efficiency.

FIG. 13 shows a second example of a process that apparatus for evaluating organization efficiency 10 evaluates organization efficiency. Apparatus for evaluating organization efficiency 10 generates communication frequencies among groups 90 at a certain time (1300). A process for generating communication frequencies among groups 90 is almost the same as that described with reference to FIG. 12. Thus, description about the process will be omitted. Organization efficiency calculation unit 150 calculates a target value of communication frequencies among groups for a group defined by group definition data. Then, organization efficiency calculation unit 150 calculates an indicator based on an achievement ratio of communication frequencies among groups to the target value as efficiency of the organization structure (1310).

For example, by comparing FIGS. 8 and 9, the number of links for defining cooperative relationship among groups in target organization structure data 80 is six and the number of frequencies of communication among groups corresponding to the cooperative relationship in communication frequencies among groups 90 is four. In this case, organization efficiency calculation unit 150 may calculate the ratio of four, which is the actual number of links, to six, which is the target number of links, i.e., 66.66% as an achievement ratio. Organization efficiency calculation unit 150 may calculate more accurate achievement ratio according to the height of the communication frequencies among groups for each group.

In addition to or instead of the process, organization efficiency calculation unit 150 may calculate an indicator based on a difference of distances between two groups (for example, the number of links taken to get the goal) in each of target organization structure data 80 and communication frequencies among groups 90 for each group defined by group definition data as efficiency of the organization structure. As another example, organization efficiency calculation unit 150 may calculate an indicator based on a difference of densities of links that connect groups for certain groups for each of target organization structure data 80 and communication frequencies among groups 90 as efficiency of the organization structure.

According to the example, the achievement ratio of communication frequencies among departments at a certain time can be checked to targeted predetermined communication frequencies. In this manner, apparatus for evaluating organization efficiency 10 can check whether or not the set management strategy is practiced or whether or not the current organization structure matches the management strategy to be set.

Figure 14:
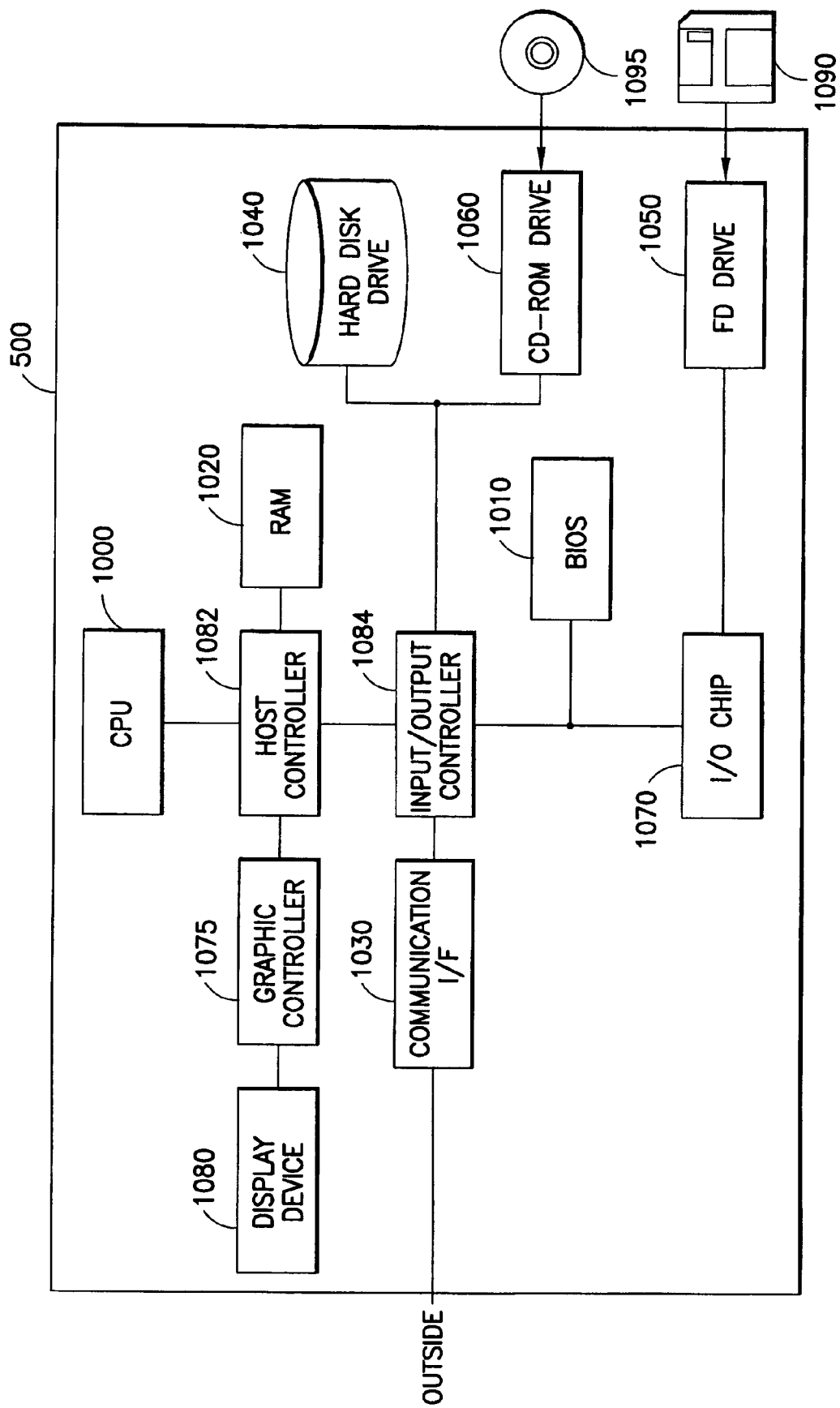
FIG. 14 shows an example of a hardware configuration of computer 500 that functions as apparatus for evaluating organization efficiency 10.

FIG. 14 shows an example of a hardware configuration of computer 500 that functions as apparatus for evaluating organization efficiency 10. Computer 500 includes a CPU peripheral unit with CPU 1000, RAM 1020, and graphic controller 1075, which are connected with each other via host controller 1082; an input/output unit with communication interface 1030, hard disk drive 1040, and CD-ROM drive 1060, which are connected to host controller 1082 via input/output controller 1084; and legacy input/output unit with BIOS 1010, flexible disk drive 1050, and input/output chip 1070, which are connected to input/output controller 1084.

Host controller 1082 connects RAM 1020 with CPU 1000, which access RAM 1020 at high transfer rate, and with graphic controller 1075. CPU 1000 operates and controls each unit on the basis of BIOS 1010 and a program stored in RAM 1020. Graphic controller 1075 obtains image data to be generated by CPU 1000 or the like on a frame buffer provided for RAM 1020 and has the image data to be displayed on display device 1080. Otherwise, graphic controller 1075 may contain a frame buffer to store image data to be generated by CPU 1000 or the like.

Input/output controller 1084 connects host controller 1082, communication interface 1030, which is a relatively high speed input/output device, hard disk drive 1040, and CD-ROM drive 1060. Communication interface 1030 communicates with an external device via a wireless network or a wired network. Hard disk drive 1040 stores a program or data to be used by computer 500. CD-ROM drive 1060 reads a program or data from CD-ROM 1095 and stores the program or data in RAM 1020 via input/output controller 1084.

Input/output controller 1084 is connected with BIOS 1010, and a relatively low speed input/output device such as input/output chip 1070. BIOS 1010 stores a boot program to be executed by CPU 1000 upon startup of computer 500, a program depending on hardware of computer 500 and the like. Input/output chip 1070 is connected with flexible disk drive 1050. Flexible disk drive 1050 reads a program or data from flexible disk 1090 and stores the program or data in RAM 1020 via input/output chip 1070 or input/output controller 1084.

Input/output chip 1070 connects flexible disk 1090 or various input/output devices via, for example, a parallel port, a serial port, a key board port, or a mouse port. A user provides a program on a storage medium such as flexible disk 1090, CD-ROM 1095, an IC card or the like for computer 500. The program is read out from a storage medium via input/output chip 1070 and/or input/output controller 1084 and installed in and executed by computer 500.

Programs shown above may be stored in an external storage medium. An optical storage medium such as a DVD or a PD, a magnetic optical storage medium such as an MD, a tape medium, semiconductor memory such as an IC card or the like may be used as a storage medium as well as flexible disk 1090 or CD-ROM 1095. A storage device such as hard disk or RAM provided for a server system connected with a private communication network or the Internet may be used as a storage medium and a program may be provided for computer 500 via the network.

The present invention has been described with reference to embodiments, though the technical scope of the present invention is not limited to the scope of the abovementioned embodiment. It is apparent for those skilled in the art that various alterations and improvement can be done to the abovementioned embodiments. It is apparent from the appended Claims that embodiments with the various alterations and improvement will be included in the technical scope of the present invention.

What is claimed is:

1. A method for generating communication frequencies, said method comprising:
   a processor of a computer apparatus generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and
   said processor displaying a graph on a display device of the computer apparatus, said graph depicting the generated communication frequencies among groups,
   wherein said generating communication frequencies among groups comprises:
      obtaining communication frequencies among members of the multiplicity of members as consisting of a number of communication interchanges occurring in a specified first period of time for each pair of members of the multiplicity of members,
      generating communication frequencies among departments of the multiplicity of departments as consisting of the obtained communication frequencies among members belonging to different departments for each pair of departments of the multiplicity of departments, and
      generating communication frequencies among groups of the multiplicity of groups as consisting of the generated communication frequencies among departments comprised by different groups for each pair of groups of the multiplicity of groups, said method further comprising:
      calculating an achievement ratio consisting of a ratio of a total number of non-zero communication frequencies among different groups for each pair of groups of the multiplicity of groups to a total number of links among groups, each link defining a cooperative relationship among different groups for each pair of groups of the multiplicity of groups; and
      determining that the calculated achievement ratio is not less than a specified targeted achievement ratio to check whether a set management strategy is practiced and whether a current organizational structure matches said set management strategy.

2. The method of claim 1, said method further comprising:
   generating second communication frequencies among groups of the multiplicity of groups for a second period of time occurring after the first period of time, wherein a new management strategy for triggering an increase in communication frequencies among groups is introduced between the first period of time and the second periods of time, and wherein the first period of time and the second period of time have a same time duration; and
   after the second period of time, determining that a totality of the second communication frequencies among groups exceeds a totality of the communication frequencies among groups for the first period of time by at least a specified percent.

3. The method of claim 1, wherein each communication interchange is an email, a meeting, a phone call, or a reading of a same document.

4. The method of claim 1, wherein the graph comprises a multiplicity of nodes and a multiplicity of edges, wherein each node denotes a unique group of the multiplicities of groups, wherein each edge connects two nodes of the graph, wherein the communication frequency between each two nodes connected by an edge is non-zero and is depicted at the edge, wherein the communication frequency depicted at each edge is non-zero, and wherein the multiplicity of nodes comprise at least one pair of nodes not connected by an edge due to a zero communication frequency occurring between the nodes of each pair of nodes of the at least one pair of nodes.

5. The method of claim 4, wherein the multiplicity of nodes in the graph comprises a first plurality of nodes and a second plurality of nodes, wherein the first plurality of nodes and the second plurality of nodes each include nodes connected by an edge and nodes not connected by an edge, and wherein no node of the first plurality of nodes is connected by an edge to any node of the second plurality of nodes.

6. A method for generating communication frequencies, said method comprising:
- a processor of a computer apparatus generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and
- said processor displaying a graph on a display device of the computer apparatus, said graph depicting the generated communication frequencies among groups,
- wherein said generating communication frequencies among groups comprises:
  - obtaining communication frequencies among members of the multiplicity of members as consisting of a number of communication interchanges occurring in a specified first period of time for each pair of members of the multiplicity of members,
  - generating communication frequencies among departments of the multiplicity of departments as consisting of the obtained communication frequencies among members belonging to different departments for each pair of departments of the multiplicity of departments, and
  - generating communication frequencies among groups of the multiplicity of groups as consisting of the generated communication frequencies among departments comprised by different groups for each pair of groups of the multiplicity of groups, said method further comprising:
- calculating a height of communication frequencies among groups consisting of a totality of the communication frequencies among groups; and
- determining that the calculated height of communication frequencies is not less than a specified targeted height of communication frequencies to check whether a set management strategy is practiced and whether a current organizational structure matches said set management strategy.

7. An apparatus for generating communication frequencies, said apparatus comprising:
- a processor; and
- a computer readable memory unit coupled to the processor, said memory unit containing program code configured to be executed by the processor to implement a method for generating said communication frequencies,
- said method comprising:
  - generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and
  - displaying a graph on a display device of the computer apparatus, said graph depicting the generated communication frequencies among groups,
  - wherein said generating communication frequencies among groups comprises:
    - obtaining communication frequencies among members of the multiplicity of members as consisting of a number of communication interchanges occurring in a specified first period of time for each pair of members of the multiplicity of members,
    - generating communication frequencies among departments of the multiplicity of departments as consisting of the obtained communication frequencies among members belonging to different departments for each pair of departments of the multiplicity of departments, and
    - generating communication frequencies among groups of the multiplicity of groups as consisting of the generated communication frequencies among departments comprised by different groups for each pair of groups of the multiplicity of groups,
  - said method further comprising:
    - calculating an achievement ratio consisting of a ratio of a total number of non-zero communication frequencies among different groups for each pair of groups of the multiplicity of groups to a total number of links among groups, each link defining a cooperative relationship among different groups for each pair of groups of the multiplicity of groups; and
    - determining that the calculated achievement ratio is not less than a specified targeted achievement ratio to check whether a set management strategy is practiced and whether a current organizational structure matches said set management strategy.

8. The apparatus of claim 7, said method further comprising:
- generating second communication frequencies among groups of the multiplicity of groups for a second period of time occurring after the first period of time, wherein a new management strategy for triggering an increase in communication frequencies among groups is introduced between the first period of time and the second periods of time, and wherein the first period of time and the second period of time have a same time duration; and
- after the second period of time, determining that a totality of the second communication frequencies among groups exceeds a totality of the communication frequencies among groups for the first period of time by at least a specified percent.

9. The apparatus of claim 7, wherein each communication interchange is an email, a meeting, a phone call, or a reading of a same document.

10. The apparatus of claim 7, wherein the graph comprises a multiplicity of nodes and a multiplicity of edges, wherein each node denotes a unique group of the multiplicities of groups, wherein each edge connects two nodes of the graph, wherein the communication frequency between each two nodes connected by an edge is non-zero and is depicted at the edge, wherein the communication frequency depicted at each edge is non-zero, and wherein the multiplicity of nodes comprise at least one pair of nodes not connected by an edge due to a zero communication frequency occurring between the nodes of each pair of nodes of the at least one pair of nodes.

11. The apparatus of claim 10, wherein the multiplicity of nodes in the graph comprises a first plurality of nodes and a second plurality of nodes, wherein the first plurality of nodes and the second plurality of nodes each include nodes connected by an edge and nodes not connected by an edge, and wherein no node of the first plurality of nodes is connected by an edge to any node of the second plurality of nodes.

12. An apparatus for generating communication frequencies, said apparatus comprising:
a processor; and
a computer readable memory unit coupled to the processor, said memory unit containing program code configured to be executed by the processor to implement a method for generating said communication frequencies,
said method comprising:
generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and
displaying a graph on a display device of the computer apparatus, said graph depicting the generated communication frequencies among groups, wherein said generating communication frequencies among groups comprises:
obtaining communication frequencies among members of the multiplicity of members as consisting of a number of communication interchanges occurring in a specified first period of time for each pair of members of the multiplicity of members,
generating communication frequencies among departments of the multiplicity of departments as consisting of the obtained communication frequencies among members belonging to different departments for each pair of departments of the multiplicity of departments, and
generating communication frequencies among groups of the multiplicity of groups as consisting of the generated communication frequencies among departments comprised by different groups for each pair of groups of the multiplicity of groups,
said method further comprising:
calculating a height of communication frequencies among groups consisting of a totality of the communication frequencies among groups; and
determining that the calculated height of communication frequencies is not less than a specified targeted height of communication frequencies to check whether a set management strategy is practiced and whether a current organizational structure matches said set management strategy.

13. A computer readable storage device, comprising a computer readable program code stored therein, said computer readable program configured to be executed by a processor of a computer apparatus to implement a method for generating communication frequencies, said method comprising:
generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and
displaying a graph on a display device of the computer apparatus, said graph depicting the generated communication frequencies among groups,
wherein said generating communication frequencies among groups comprises:
obtaining communication frequencies among members of the multiplicity of members as consisting of a number of communication interchanges occurring in a specified first period of time for each pair of members of the multiplicity of members,
generating communication frequencies among departments of the multiplicity of departments as consisting of the obtained communication frequencies among members belonging to different departments for each pair of departments of the multiplicity of departments, and
generating communication frequencies among groups of the multiplicity of groups as consisting of the generated communication frequencies among departments comprised by different groups for each pair of groups of the multiplicity of groups, said method further comprising:
calculating an achievement ratio consisting of a ratio of a total number of non-zero communication frequencies among different groups for each pair of groups of the multiplicity of groups to a total number of links among groups, each link defining a cooperative relationship among different groups for each pair of groups of the multiplicity of groups; and
determining that the calculated achievement ratio is not less than a specified targeted achievement ratio to check whether a set management strategy is practiced and whether a current organizational structure matches said set management strategy.

14. The storage device of claim 13, said method further comprising:
generating second communication frequencies among groups of the multiplicity of groups for a second period of time occurring after the first period of time, wherein a new management strategy for triggering an increase in communication frequencies among groups is introduced between the first period of time and the second periods of time, and wherein the first period of time and the second period of time have a same time duration; and
after the second period of time, determining that a totality of the second communication frequencies among groups exceeds a totality of the communication frequencies among groups for the first period of time by at least a specified percent.

15. The storage device of claim 13, wherein each communication interchange is an email, a meeting, a phone call, or a reading of a same document.

16. The storage device of claim 13, wherein the graph comprises a multiplicity of nodes and a multiplicity of edges, wherein each node denotes a unique group of the multiplicities of groups, wherein each edge connects two nodes of the graph, wherein the communication frequency between each two nodes connected by an edge is non-zero and is depicted at the edge, wherein the communication frequency depicted at each edge is non-zero, and wherein the multiplicity of nodes comprise at least one pair of nodes not connected by an edge due to a zero communication frequency occurring between the nodes of each pair of nodes of the at least one pair of nodes.

17. The storage device of claim 16, wherein the multiplicity of nodes in the graph comprises a first plurality of nodes and a second plurality of nodes, wherein the first plurality of nodes and the second plurality of nodes each include nodes connected by an edge and nodes not connected by an edge, and wherein no node of the first plurality of nodes is connected by an edge to any node of the second plurality of nodes.

18. A computer readable storage device, comprising a computer readable program code stored therein, said computer readable program configured to be executed by a processor of a computer apparatus to implement a method for generating communication frequencies, said method comprising:

generating communication frequencies among groups of a multiplicity of groups of an organization, wherein the organization comprises a multiplicity of members, a multiplicity of departments, and the multiplicity of groups, wherein each member is an individual who belongs to a department of the multiplicity of departments, wherein each department comprises a plurality of members of the multiplicity of members, and wherein each group comprises a plurality of departments of the multiplicity of departments; and displaying a graph on a display device of the computer apparatus, said graph depicting the generated communication frequencies among groups, wherein said generating communication frequencies among groups comprises:

obtaining communication frequencies among members of the multiplicity of members as consisting of a number of communication interchanges occurring in a specified first period of time for each pair of members of the multiplicity of members, generating communication frequencies among departments of the multiplicity of departments as consisting of the obtained communication frequencies among members belonging to different departments for each pair of departments of the multiplicity of departments, and generating communication frequencies among groups of the multiplicity of groups as consisting of the generated communication frequencies among departments comprised by different groups for each pair of groups of the multiplicity of groups, said method further comprising:

calculating a height of communication frequencies among groups consisting of a totality of the communication frequencies among groups; and determining that the calculated height of communication frequencies is not less than a specified targeted height of communication frequencies to check whether a set management strategy is practiced and whether a current organizational structure matches said set management strategy.

\* \* \* \* \*